(12) United States Patent
Lane

(10) Patent No.: US 10,899,514 B2
(45) Date of Patent: Jan. 26, 2021

(54) FOOD JAR

(71) Applicant: THERMOS L.L.C., Schaumburg, IL (US)

(72) Inventor: Marvin Lane, Wheeling, IL (US)

(73) Assignee: THERMOS L.L.C., Schaumburg, IL (US)

(*) Notice: Subject to any disclaimer, the term of this patent is extended or adjusted under 35 U.S.C. 154(b) by 41 days.

(21) Appl. No.: 16/369,195

(22) Filed: Mar. 29, 2019

(65) Prior Publication Data

US 2019/0308782 A1  Oct. 10, 2019

Related U.S. Application Data

(60) Provisional application No. 62/655,757, filed on Apr. 10, 2018.

(51) Int. Cl.
| | |
|---|---|
| *B65D 51/24* | (2006.01) |
| *B65D 81/38* | (2006.01) |
| *B65D 23/10* | (2006.01) |
| *B65D 25/20* | (2006.01) |
| *B65D 43/02* | (2006.01) |

(52) U.S. Cl.
CPC ......... *B65D 51/247* (2013.01); *B65D 23/104* (2013.01); *B65D 25/20* (2013.01); *B65D 43/0231* (2013.01); *B65D 81/3841* (2013.01); *B65D 2251/0018* (2013.01); *B65D 2251/0081* (2013.01); *B65D 2251/06* (2013.01)

(58) Field of Classification Search
CPC .... B65D 51/247; B65D 51/246; B65D 51/24; B65D 51/242; B65D 51/18; B65D 51/28; B65D 23/104; B65D 23/10; B65D 25/20; B65D 43/0231; B65D 43/0225; B65D 81/3841; B65D 81/3837; A45C 11/20
USPC ............ 220/212.5, 212, 254.8, 254.1, 259.3, 220/259.4, 256.1, 630, 628; 215/364, 215/355, 227, 228; 206/546, 547, 541, 206/223
See application file for complete search history.

(56) References Cited

U.S. PATENT DOCUMENTS

| | | | |
|---|---|---|---|
| 4,573,597 A * | 3/1986 | Adams ................. | B65D 23/001 215/372 |
| 2013/0248531 A1* | 9/2013 | Lane ...................... | A47J 47/02 220/262 |
| 2019/0039782 A1* | 2/2019 | Campbell .......... | A47G 23/0241 |

FOREIGN PATENT DOCUMENTS

CN          205548223 U       9/2016

OTHER PUBLICATIONS

Taiwan Patent Application No. 108112313; Office Acton dated Sep. 22, 2020 (translation) (5 pages).

* cited by examiner

*Primary Examiner* — Robert J Hicks
(74) *Attorney, Agent, or Firm* — Polsinelli PC

(57) ABSTRACT

A food jar is described that may be used to store and transport food items. The food jar includes a container. The container defines an interior to store a food product. A stopper is sized to close an opening of the container. A base removably engages to a lower portion of the container.

17 Claims, 16 Drawing Sheets

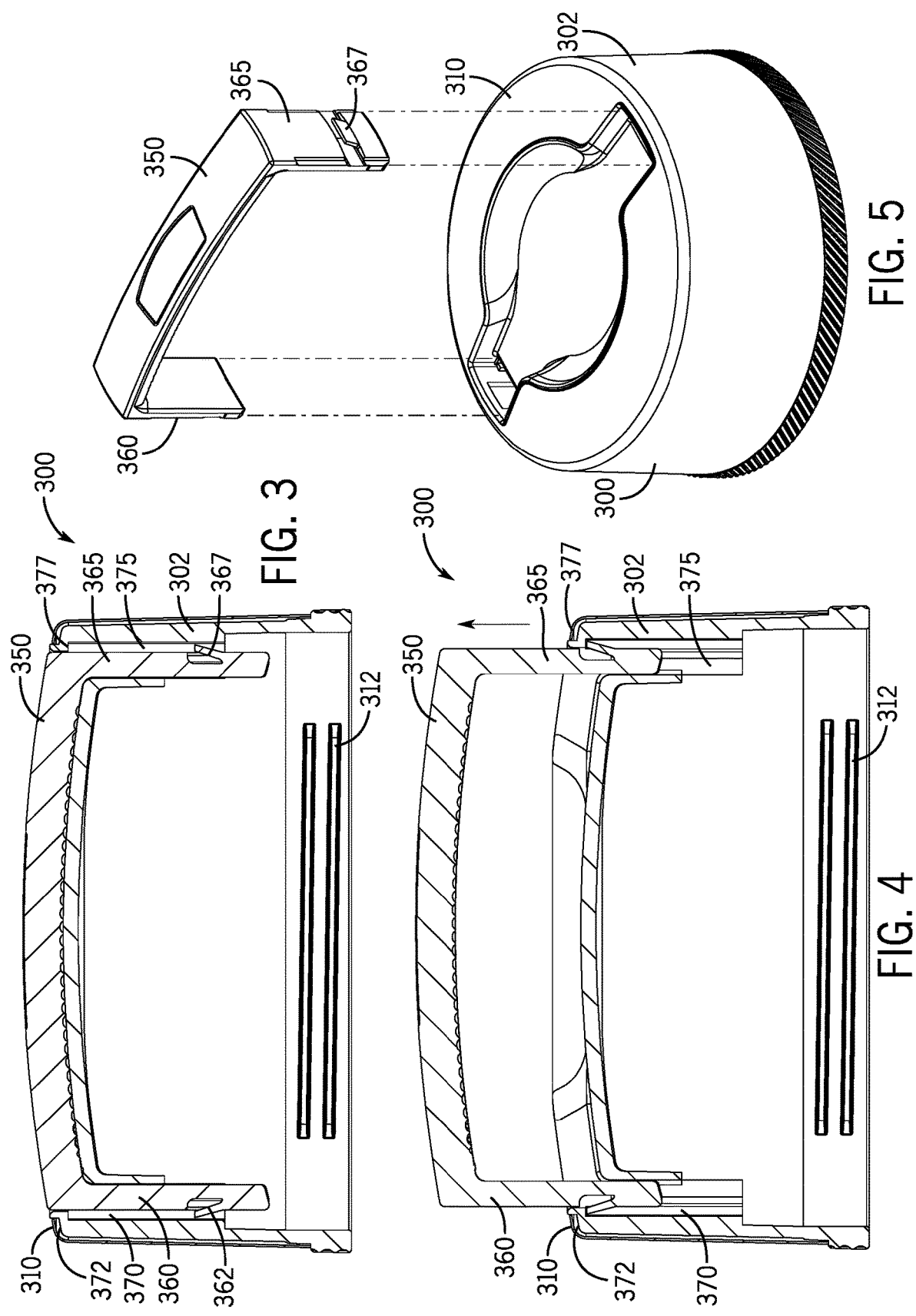

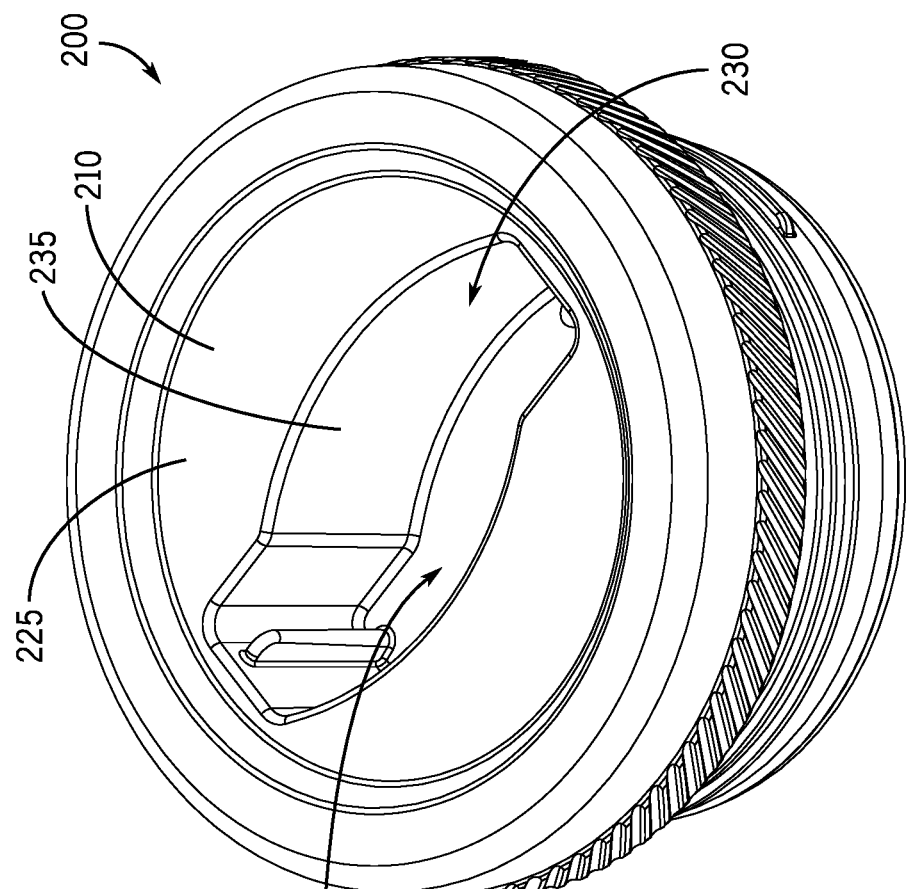
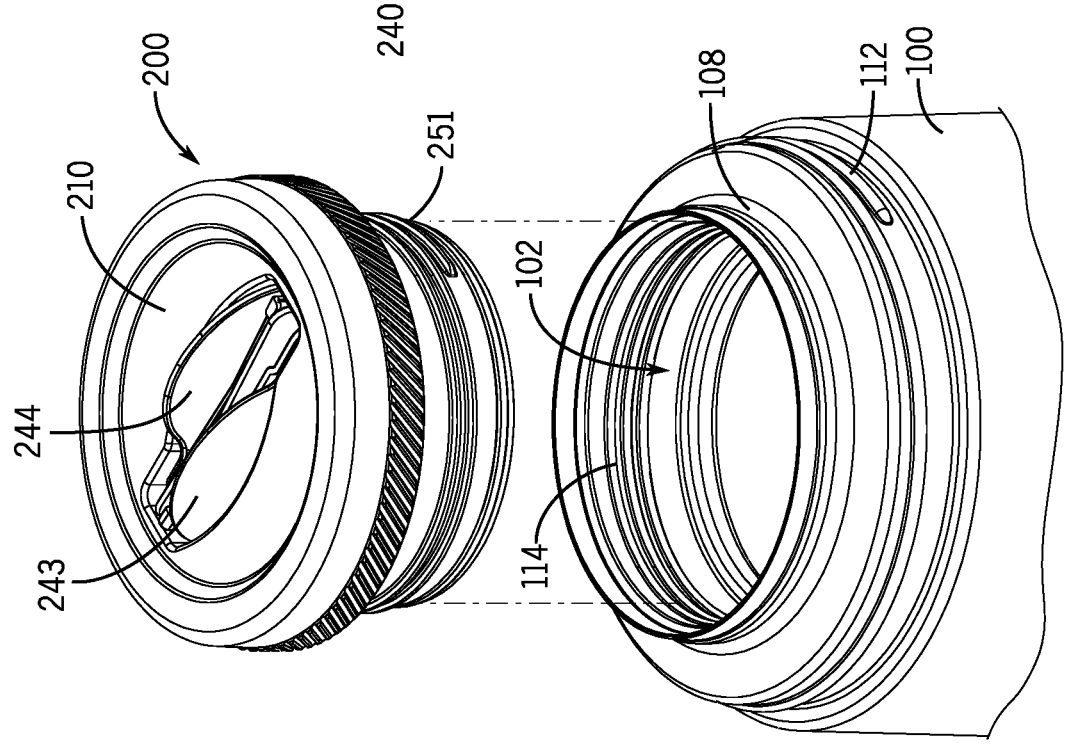

FOOD JAR

CROSS REFERENCE TO RELATED APPLICATIONS

This application claims priority to U.S. Provisional Patent Application No. 62/655,757 filed Apr. 10, 2018.

FIELD OF INVENTION

The present invention relates to a food jar.

BACKGROUND

Food containers are often used to store and transport food items. In the past, food jars generally only have one container for one person to eat or drink from. If the user wants to provide food or drink to multiple people, then extra bowls and utensils are needed to be carried along with the food jar. Such extra items may be easy to forget or misplace.

SUMMARY

A food jar is described that may be used to store and transport food items or drink items for multiple people. The food jar includes an insulated or uninsulated structure to store the food items, possibly at warmed or chilled temperatures for later consumption.

The food jar may include a container, a stopper, a lid, and a base. The container includes an interior to store a food item or could be configured to store beverage items. The lid and/or stopper closes an opening of the container. The base removably engages to a bottom or lower portion of the container. The base may be removed from the container in order for the base to serve as a bowl.

In one aspect, a food jar is described. The food jar includes a container. The container defines an interior to store a food product. The container forms an opening. A stopper is sized to removably close the opening of the container. The container includes a retainer positioned at a lower portion of the container. The retainer includes an upper edge. The container includes a protruding edge positioned near the upper edge of the retainer. A groove is formed between the protruding edge and the upper edge of the retainer. A base is configured to removably engage to the lower portion of the container. An inner surface of the base includes an extending portion. The groove receives the extending portion to engage the base to the container.

In another aspect, a food jar is described. The food jar includes a container. The container defines an interior to store a food product. The container forms an opening. A stopper is sized to removably close the opening of the container. The container includes a retainer positioned at a lower portion of the container. The retainer includes an upper edge and a lower edge. The lower edge is adjacent to a bottom of the container. A groove or track is formed next to the upper edge of the retainer. A base is configured to removably engage to the lower portion of the container. An inner surface of the base includes a rib that forms a segment on an inside of a sidewall of the base. The groove or track receives the rib to engage the base to the container.

In another aspect, a food jar is described. The food jar includes a container. The container defines an interior to store a food product. The container forms an opening. The stopper is sized to removably close the opening of the container. The container includes a protrusion positioned at or near a bottom circumference of the container. A base is configured to removably engage to a lower portion of the container. An inner surface of the base includes a channel with a first portion and a second portion. The second portion is generally perpendicular to the first portion. The channel receives the protrusion to engage the base to the container.

In another aspect, the stopper forms a compartment or storage region configured to hold two or more utensils.

In another aspect, the container includes a base configured to detachably engage to the container. The base defines a storage region. One or more bowls may be positioned in the storage region. The base may be detached from the container to access the bowl, which may be used as a food serving device. The base also serves as a protective outer cover to the container.

In further aspects, the food jar may provide utensils and bowls for several users. The food jar provides the multiple utensils and bowls in a unitary or one-piece configuration. The food jar holds the multiple utensils and/or the multiple bowls. A single food jar may be used to store food and then serve the food to a couple, a family, co-workers, etc. A first user may pour a part of the contents of the food jar into the bowl for a second user, and then the first user may eat directly from the food jar.

In further aspects, the stopper may screw directly to an upper portion of the container to cover the opening of the container or to other structures of the container. The stopper and the container may include complementary threaded surfaces for engaging the stopper to the container. The lid may also thread to the container. In another aspect, the stopper is held over the opening of the container by the lid. The lid screws onto the container causing the stopper to seal against the container, thereby closing the opening.

In other aspects, the lid may include a retractable handle. The handle may be pulled up to a carrying position or pushed down to a storage position.

BRIEF DESCRIPTION OF DRAWINGS

FIG. 3 is a sectional view of the lid.

FIG. 4 is a sectional view of the lid with the handle extended.

FIG. 5 shows the engagement of the handle to the lid.

FIG. 7 shows the engagement of the stopper to the container.

FIG. 8 is a perspective view of the stopper.

DETAILED DESCRIPTION OF INVENTION

Figure 1:
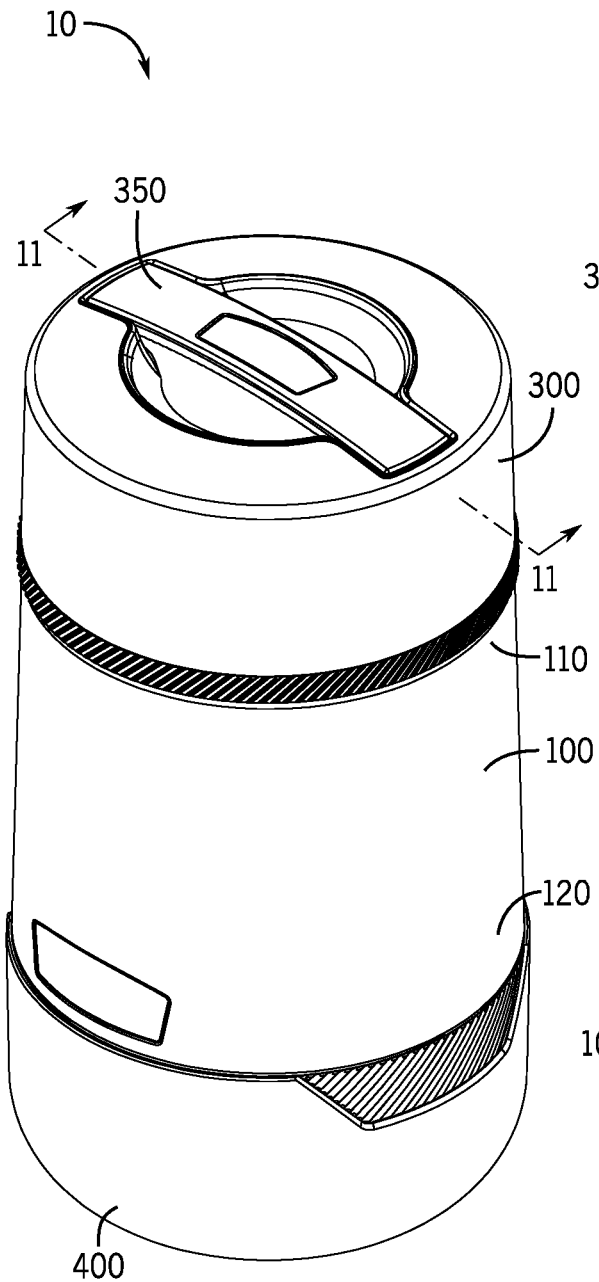
FIG. 1 is a perspective view of an embodiment of a food jar.
Figure 2:
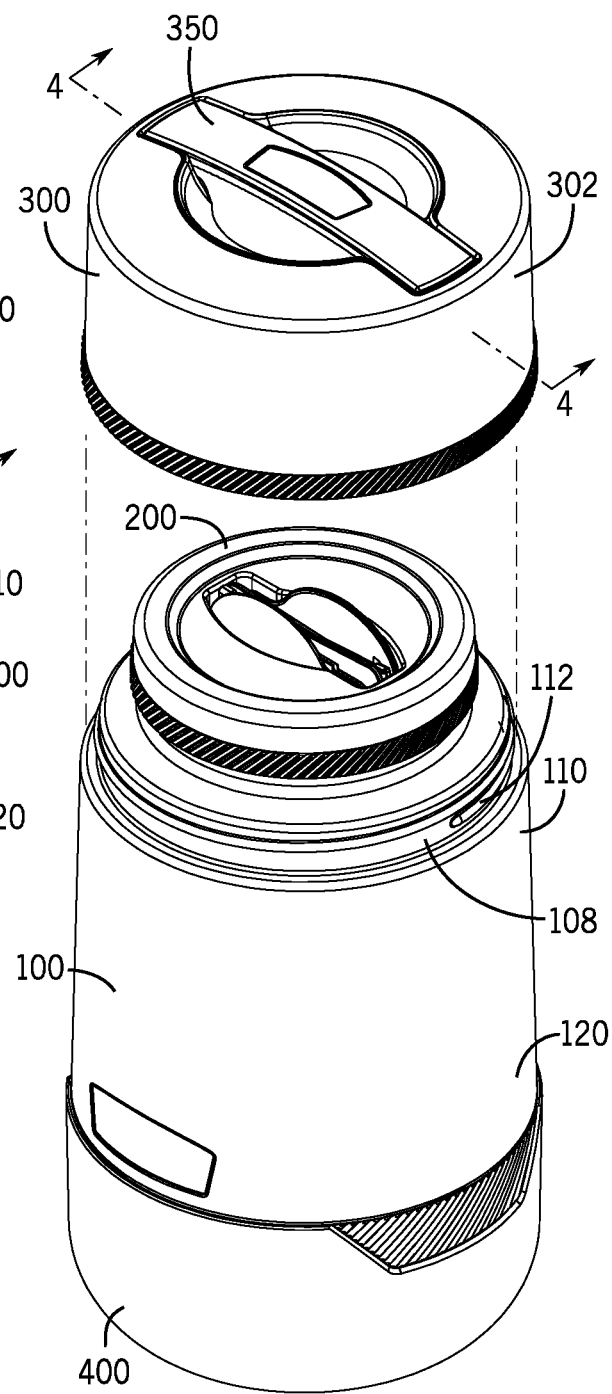
FIG. 2 is a perspective view of an embodiment of the food jar with the lid removed.
Figure 6:
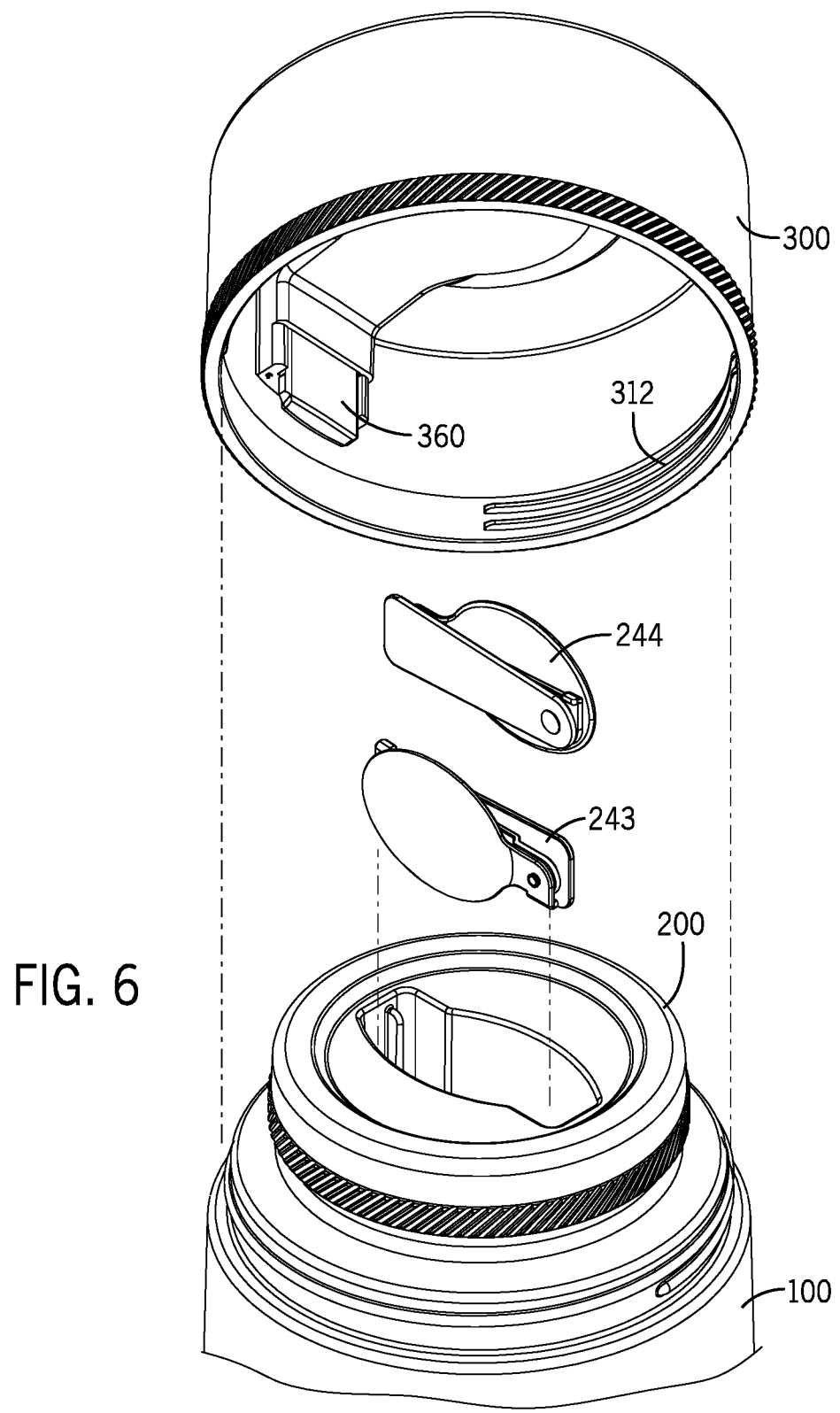
FIG. 6 shows an exploded view of the lid and the stopper.

For purposes of this application, any terms that describe relative position (e.g., "upper", "middle", "lower", "outer", "inner", "above", "below", "bottom", "top", etc.) refer to an embodiment of the invention as illustrated, but those terms do not limit the orientation in which the embodiments can be used. A food jar 10 will now be described with references to FIGS. 1-20. The food jar 10 includes a container 100, a stopper 200, a lid 300, and a base 400. The lid 300 removably engages to an upper portion 110 of the container 100, while the base 400 removably engages to a lower portion 120 of the container 100.

The container 100 includes a wide mouth opening 102 to readily accept food items such as stews, chili, soups, beverages, or other foods that might not fit so easily into a narrow mouth container. The container 100 may be vacuum insulated or insulated with an insulating material. The opening 102 leads into an interior 104 of the container 100 that holds the food items. The stopper 200 includes an upper body 220 and a lower body 250. The stopper 200 removably engages to the upper portion 110 of the container 100 to cover the opening 102 of the container 100. The lid 300 is positioned over the stopper 200. The base 400 removably engages to the lower portion 120 of the container 100. The base 400 may be detached from the lower portion 120 of the container 100 to provide a bowl for serving food items of the container 100. The base 400 may be reattached to the lower portion 120 of the container 100, after cleaning or use, so that such base 400 may be easily transported together with the other components of the food jar 10.

With reference to FIG. 7, the illustrated aspect of the container 100 includes a neck 108 with a threaded exterior surface 112. The lid 300 includes a threaded internal surface 312. The lid 300 is engaged to the container 100 by threadably engaging the threaded internal surface 312 of the lid 300 with the threaded exterior surface 112 of the neck 108.

The neck 108 further includes a threaded internal surface 114. The lower body 250 of the stopper 200 includes a threaded external surface 251 to threadably engage with the threaded internal surface 114 of the neck 108.

Figure 9:
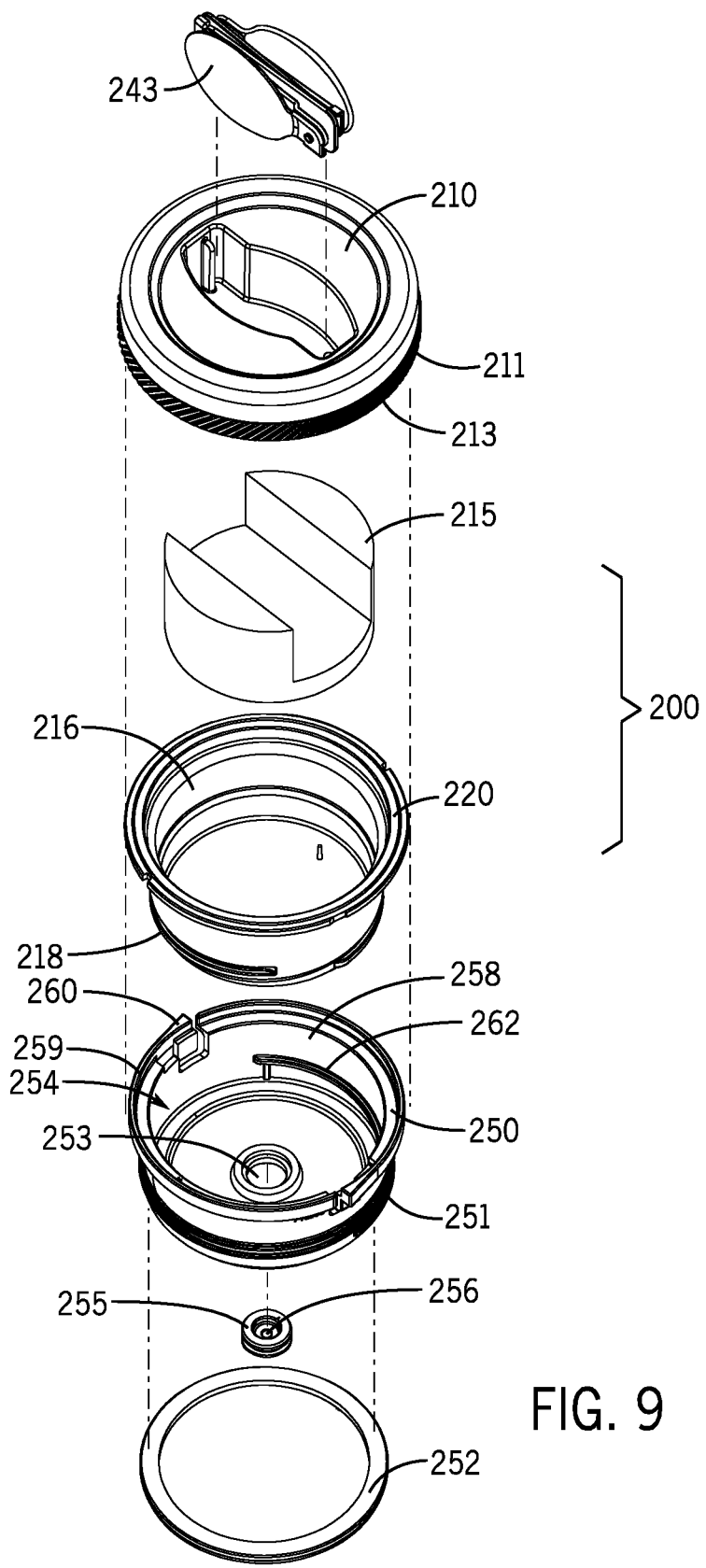
FIG. 9 is an exploded view of the stopper.

With reference to FIG. 9, the illustrated stopper 200 includes a top 210, the upper body 220, and the lower body 250. As the stopper 200 is threadably engaged to the container 100, a lower stopper seal 252 is urged or pressed against an internal surface of the neck 108 or the container 100 to seal the container 100 to a closed position. The lower stopper seal 252 may be positioned on a lower, outer diameter of the lower body 250. Insulation 215 may also be contained in the upper body 220.

The lower body 250 includes a vent passage 253 that provides for gas/air to pass to or from the container 100, when the stopper 200 is closing the container 100. In this aspect, the vent passage 253 may include an opening in the lower body 250. The upper body 220 includes a lower surface 212 that includes or forms a closing member 214 that interacts with the vent passage 253 of the lower body 250. The closing member 214 is on the underside of the upper body 220. The closing member 214 is inserted into the vent passage 253 as the upper body 220 is screwed into the lower body 250, which closes the vent passage 253. The closing member 214 is removed from the vent passage 253 as the upper body 220 is unscrewed from the lower body 250 to open the vent passage 253. This allows interior pressure within the container 100 to equalize with ambient pressure.

The upper body 220 threadably fits into an interior 254 of the lower body 250. The upper body 220 includes a sidewall 216 with a threaded external surface 218. The lower body 250 includes a sidewall 258 with a threaded internal surface 262. When the upper body 220 is screwed to the lower body 250, the threaded external surface 218 of the exterior of the upper body 220 threadably engages with the threaded internal surface 262 of the interior of the lower body 250. In certain aspects, the threaded engagement is configured to permit complete separation of the upper body 220 from the lower body 250, while in other aspects, the upper body 220 and the lower body 250 may rotate relative to one another, but are not configured to be completely separable.

The top 210 of the stopper 200 includes a rim 211 with gripping surfaces 213 for the user to grip onto while rotating the stopper 200. With respect to FIG. 20, the top 210 further includes one or more projecting members 217 that engage to the upper body 220 and to the lower body 250. The projecting members 217 engage with one or more flexible catches 260 formed in an upper rim 259 of the sidewall 258 of the lower body 250. The flexible catches 260 may be formed proximate relief cuts in the sidewall 258. As the user unscrews the upper body 220, the projecting members 217 will ultimately contact and engage the flexible catches 260 and drive the lower body 250 in the same unscrewing direction. In contrast, when the upper body 220 is tightened to the lower body 250, the projecting members 217 contact the flexible catches 260 and deflect the flexible catches 260. As such, the flexible catches 260 do not interfere with the tightening of the upper body 220 to the lower body 250. With respect to FIG. 20, the projecting members 217 are spaced to provide for the upper body 220 to unscrew sufficiently to withdraw the closing member 214 from the vent passage 253 before the projecting members 217 engage the flexible catches 260 to drive the lower body 250 in the same unscrewing direction. This opens the vent passage 253 to allow the pressure within the container 100 to equilibrate with the ambient environment before unscrewing the lower body 250 from the container 100.

In this aspect, the vent passage 253 includes a gasket 255 with a gasket opening 256. The gasket 255 is made of a resiliently flexible material that seals against the vent passage 253. The gasket 255 may line the vent passage 253.

As the upper body 220 is unscrewed in a low pressure situation within the container 100, ambient air external to the food jar 10 may pass through the vent passage 253 and the gasket 255 and into the interior of the container 100 in order to relieve the vacuum. In a high pressure situation within the container 100, air or gas in the interior may exit the container 100 through the vent passage 253, and out of the food jar 10.

Figure 11:
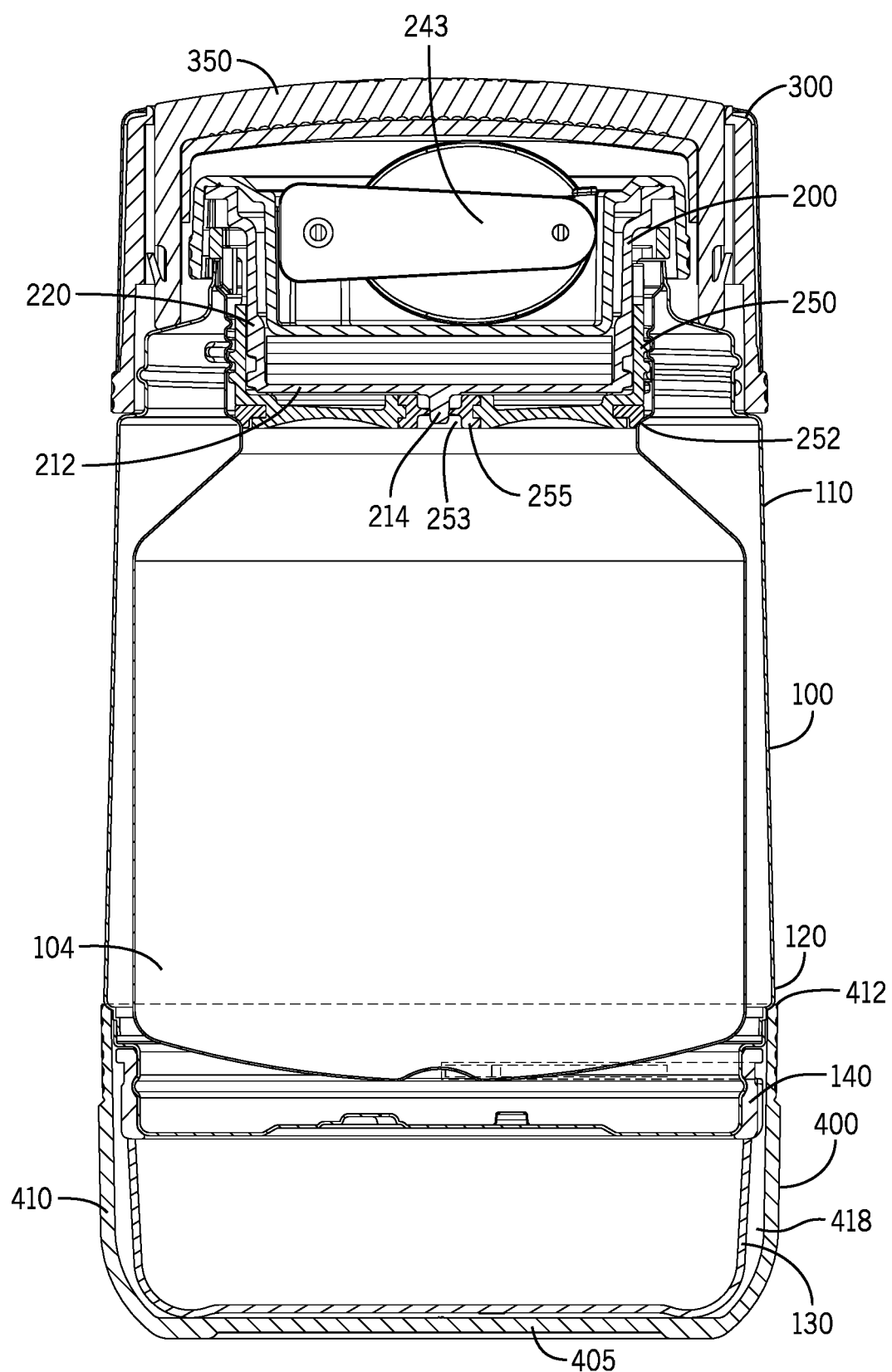
FIG. 11 is a sectional view of the food jar.

With respect to FIG. 11, the lower surface 212 of the upper body 220 is shown. The closing member 214 extends or projects from the lower surface 212. This provides for the closing member 214 to enter the gasket opening 256 (or vent passage 253 in aspects without a gasket 255) and close the gasket opening 256 as the stopper 200 is screwed to the container 100. As the stopper 200 is screwed to the container 100, the closing member 214 moves closer to the gasket opening 256, and, as the stopper 200 is further threaded to the container 100, the closing member 214 enters or inserts into the gasket opening 256. When the threaded surfaces are fully tightened, the closing member 214 is fully inserted into the gasket opening 256 and closes the gasket 255.

The closing member 214 may be centrally located on the lower surface 212. A central axis of the closing member 214 is aligned with a central axis of the vent passage 253 or gasket opening 256 (as applicable for the aspect). The lower surface 212 of the upper body 220 may be generally flat. The closing member 214 extends or projects from the lower surface 212 of the upper body 220.

The vent passage 253 of the stopper 200 releases pressure from within the container 100 before the stopper 200 is fully twisted off of the container 100. When the stopper 200 is at least partially unscrewed, the vent passage 253 is opened to vent the interior of the container 100 in a controlled manner. This is advantageous since there is a possibility that pressure may build up in the interior of the container 100 when the container 100 has been agitated or the food has been stored in the container 100 for too long. The partial unscrewing of the stopper 200 may open the vent passage 253 of the stopper 200 to release a vacuum that has formed within the container 100 when the food item has cooled in the food jar 10. This provides for easier removal of the stopper 200. The vent passage 253 is able to relieve pressure within the container 100 without totally removing the stopper 200, which helps reduce inadvertent food spray when the high pressure within the container 100 is relieved.

The closing member 214 may be configured in alternative structures such as, other closing members, descending members, plugs, stoppers, extensions, etc. positioned or formed on or of the upper body 220 that inserts into, seals, blocks, or otherwise closes a vent of the lower body 250. The screwing of the upper body 220 to the container lower body 250 aligns the closing member 214 with the gasket opening 256 of the vent passage 253.

The gasket 255 is positioned at or in the vent passage 253. The gasket 255 may be formed from an elastomeric or resilient material. In a normal position with relatively equal pressures in the container 100 and in the ambient environment, the gasket 255 seals against the closing member 214 to close the vent passage 253. When the pressure in the container 100 elevates to a high pressure condition, the gasket 255 may deflect or deform to release pressure from within the container 100. The gasket 255 may also provide an automatic release of pressure without having to move the upper body 220 or otherwise move upper body 220.

In the illustrated aspects, the top 210 fits over the upper body 220, and the upper body 220 fits into the lower body 250. With respect to FIG. 8, the top 210 includes an upper surface 225, and a recess 230 is formed in the upper surface 225. The recess 230 may be formed by a descending portion 235 of the top 210. The recess 230 forms a storage region 240. The storage region 240 is shaped to hold two or more utensils 243, 244. Although the storage region 240 is shaped and sized to hold the two utensils, 243, 244, the storage region 240 may also contain or store a single utensil, condiments, drink additives, crackers, seasonings, other food products, etc. The lid 300 is configured to engage the container 100, and to cover the storage region 240. In other aspects, there may be a separate covering for the storage region 240.

The lower body 250 of the stopper 200 has the generally open interior 254. The upper body 220 is shaped or configured to be complementary with the lower body 250. The combination of the upper body 220 and the lower body 250 close the opening 102 of the container 100 to maintain the contents of the container 100 in the container 100 without leakage or with minimal leakage of the contents from the container 100. In the aspect shown, the upper body 220 threadably engages to the interior of the lower body 250. In other aspects, the upper body 220 may be otherwise threadably engaged to each other or press fit into the lower body 250.

With respect to FIGS. 3-5, a top surface 310 of the lid 300 may include a retractable handle 350. The retractable handle 350 is configured to extend up to a carrying position and is configured to retract down to a storage position. The retractable handle 350 provides a convenient gripping structure for carrying the food jar 10. The retractable handle 350 retracts against the top surface 310 to be flush against the top surface 310. The retractable handle 350 is mounted to legs 360 and 365, which may be positioned on opposite sides of the retractable handle 350. The legs 360 and 365 are received into a lid body 302, when the retractable handle 350 is in a retracted position. In the aspect shown, the legs 360 and 365 are in sliding engagement with channels 370 and 375 of the lid 300. The legs 360 and 365 extend and retract from the channels 370 and 375. The legs 360 and 365 include biasing tabs 362 and 367, respectively, which engage with edges 372 and 377 of the channels 370 and 375 to hold the retractable handle 350 to the lid 300. The lid 300 may include a two-part construction having an inner lid member and an outer lid member. In other aspects, the lid 300 may be formed from a single member. Other handles known in the art may be added or replace the illustrated handle 350.

Figure 10:
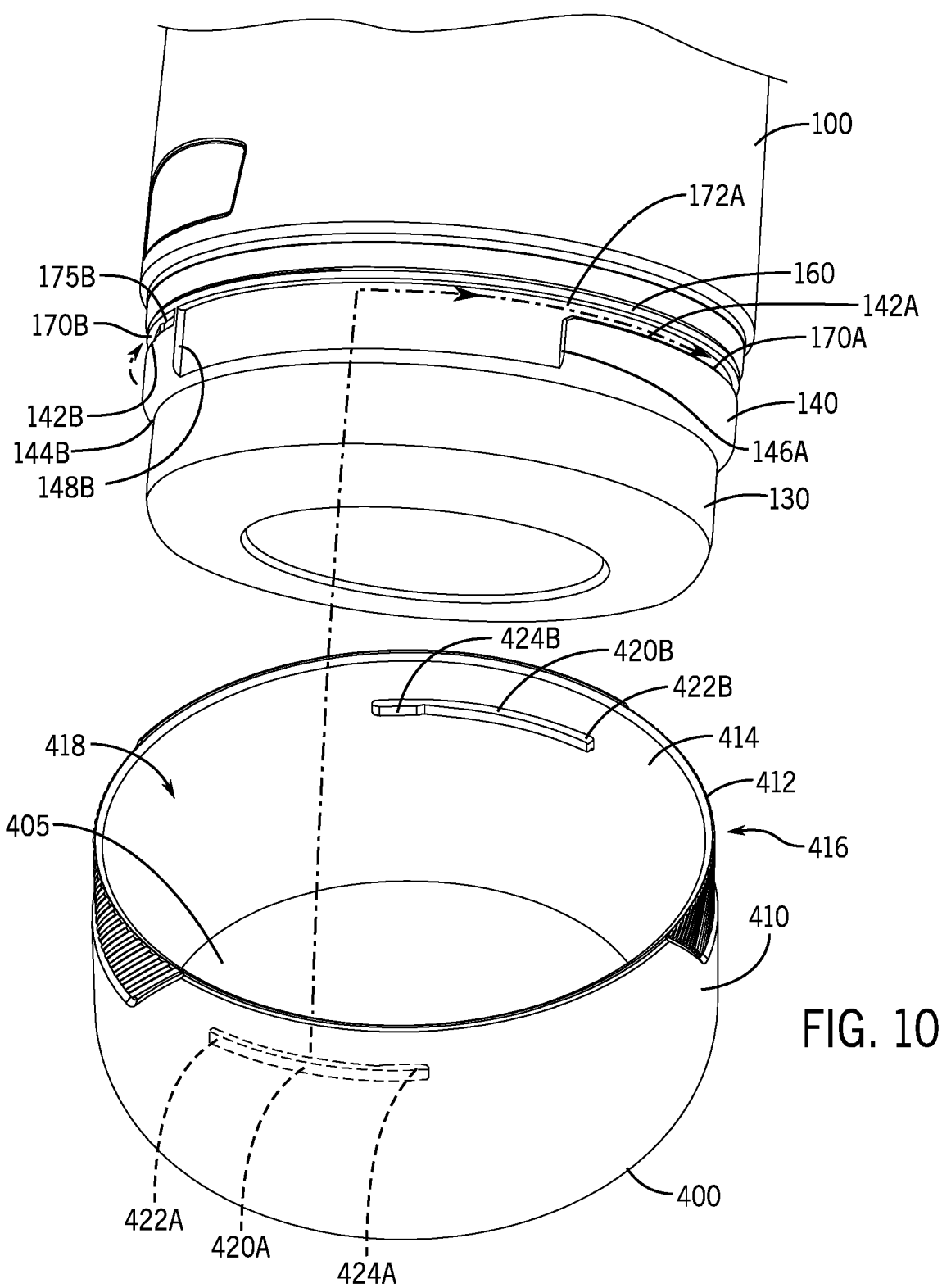
FIG. 10 shows the engagement of the base to the container.
Figure 12:
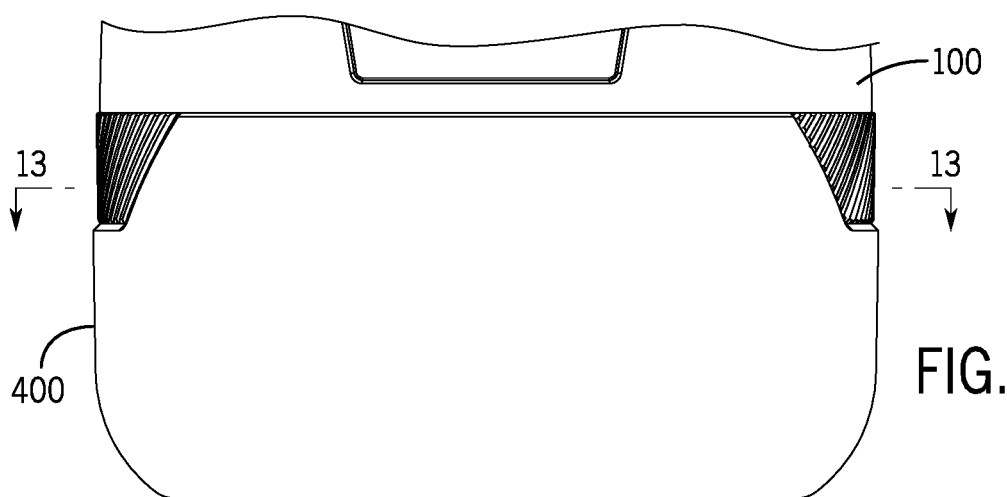
FIG. 12 shows the base engaged to the container.
Figure 13:
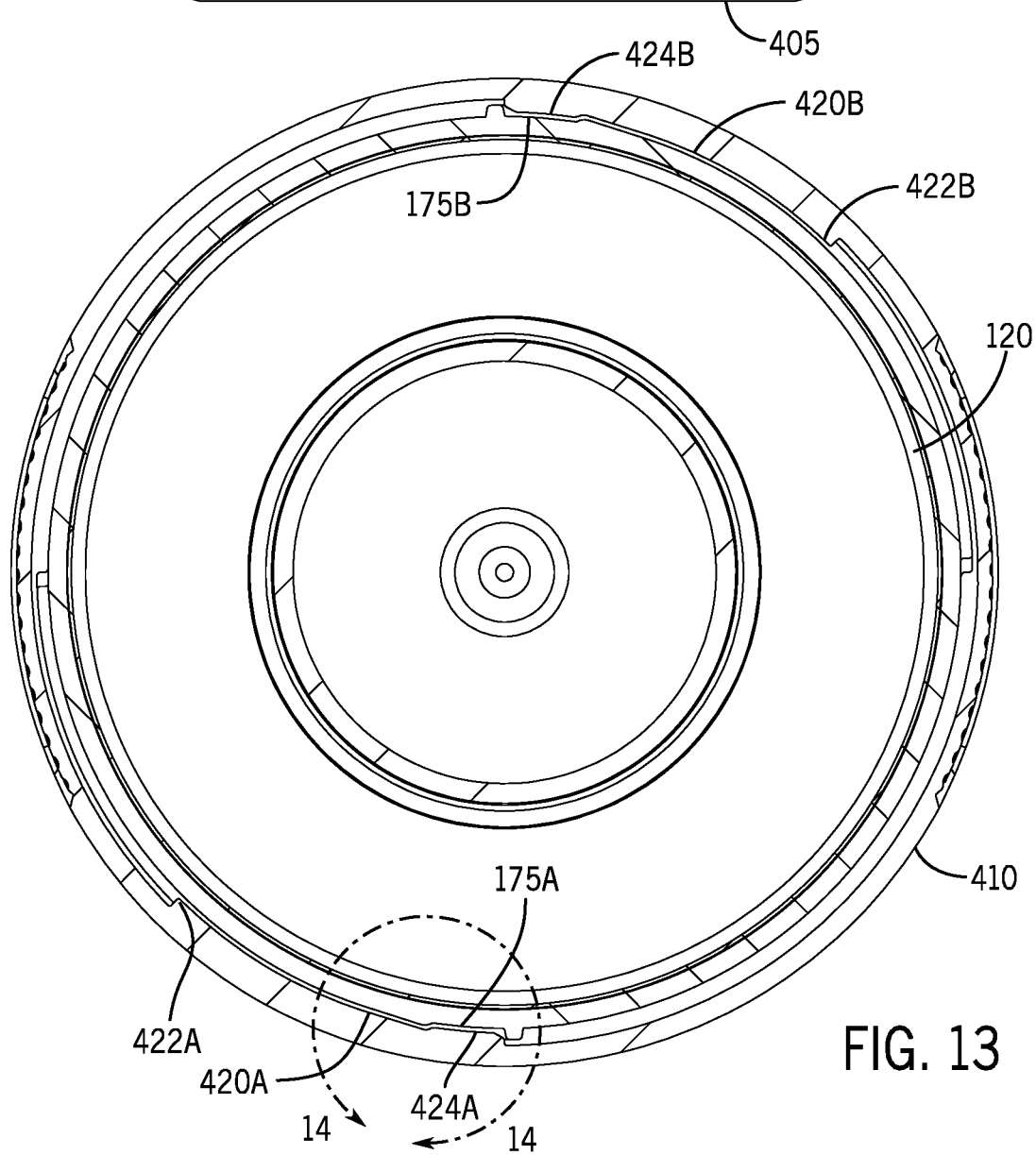
FIG. 13 is a sectional view of the base engaged to the container.
Figure 14:
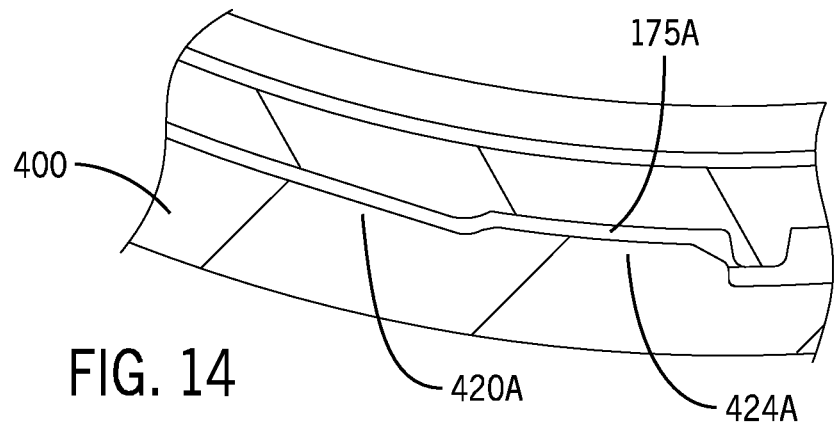
FIG. 14 is a detailed view of the base engaged to the container.

With respect to FIGS. 10-12, a base 400 is configured to detachably engage to the container 100. The base 400 detachably engages to the lower portion 120 of the container 100. The base 400 includes a generally concave shape that may form a bowl or vessel for serving the food contents of the container 100. The base 100 includes a generally flat bottom 405 that transitions into a sidewall 410. The generally flat bottom 405 may be generally perpendicular to the sidewall 410. The sidewall 410 leads into an upper rim 412 that defines a circular opening 416 of the base 400. An interior of the base 400 is generally hollow or open to form a receiving space 418 that may receive the lower portion 120 (or a portion thereof) of the container 100 or the food contents.

The container 100 and the base 400 have complementary engaging or locking mechanisms, such as a bayonet attachment, press-fit attachment, twist to lock attachment, threaded attachment, or the like to hold the base 400 to the container 100. In this aspect, the base 400 removably or detachably engages to the lower portion 120 of the container 100 via a twist to lock engagement. As described below in greater detail, a first extending portion 420A of the sidewall 410 and a second extending portion 420B of the sidewall 410 engage with a retainer 140 of the lower portion 120 of the container 100 to hold the base 400 to the container 100. In this aspect, the first and second extending portions 420A and 420B are on opposite sides of an interior surface of the base 400 and engage with grooves 170A and 170B formed by the retainer 140 on opposite sides of the lower portion 120 of the container 100. In other aspects, the extending portions 420A and 420B and the grooves 170A and 170B may be arranged in any complementary fashion.

As shown in FIG. 11, the lower portion 120 of the container 100 includes a nested element 130. In the illustrated aspect, the nested element 130 is configured as a removable secondary bowl, which is sized and positioned to fit within the base 400. When the base 400 is fully engaged to the lower portion 120 of the container 100, the nested element 130 is nested within and may touch but not attach to other components. When the base 400 and nested element 130 are both removed from the container 100, the user has two separate bowls to more easily serve two different foods or food for two people. The user may also store food, condiments, utensils, keys, or other items in the nested element 130. In certain aspects, the nested element 130 may also removably attach to the base 400 or the lower portion 120 rather than being held in by the base 400.

In alternative aspects, the nested element 130 is not intended to be removable from the lower portion 120. The nested element 130 may include additional insulation. The nested element 130 may provide a decorative cover to hide the welding used in the bottom of the container 100. The nested element 130 may provide a stable base in order to rest the container 100 on a table, desk or other flat surface. The nested element 130 may also aid in positioning and directing the base 400 as the base 400 is engaged to the lower portion 120 of the container 100.

An inner surface 414 of the sidewall 410 of the base 400 includes the first extending portion 420A and the second extending portion 420B. The extending portions 420A and 420B may include a rib, thread or other protrusion that forms a segment on an inside of the sidewall 410. The extending portions 420A and 420B protrude from the inner surface 414 of the sidewall 410. The extending portions 420A and 420B are generally parallel to the generally flat bottom 405 and to the upper rim 412 in the illustrated aspect. The extending portions 420A and 420B are spaced a distance from the upper rim 412. In the aspect shown, the first extending portion 420A includes a first end 422A and a second end 424A, and the second extending portion 420B includes a first end 422B and a second end 424B. In this aspect, the second ends 424A and 424B protrudes further from the inner surface 414 of the sidewall 410 than the first ends 422A and 422B, i.e., the second ends 424A and 424B are thicker than the first ends 422A and 422B.

The retainer 140 of the lower portion 120 of the container 100 extends from an outer surface 150 of the container 100. The retainer 140 may be a separate component that is intended to be permanently affixed to the outer surface 150 of the container 100. For example, the retainer 140 may be glued, welded, or otherwise bonded to the outer surface 150 of the container 100. For example, the retainer 140 may be formed from a plastic material that is affixed to a metallic container 100. Such plastic material may have properties beneficial for this component such as molded manufacturing, cheaper material or manufacturing, or more flexibility in the material relative to other materials, for example, stainless steel. For example, the retainer 140 may include a ring-like structure that slides on or engages to the lower portion 120 of the container 100. The retainer 140 may also be molded or formed into the material forming the outer surface 150 of the container 100, i.e., the retainer 140 may be an integral portion of the outer surface 150 of the container 100.

Figure 15:
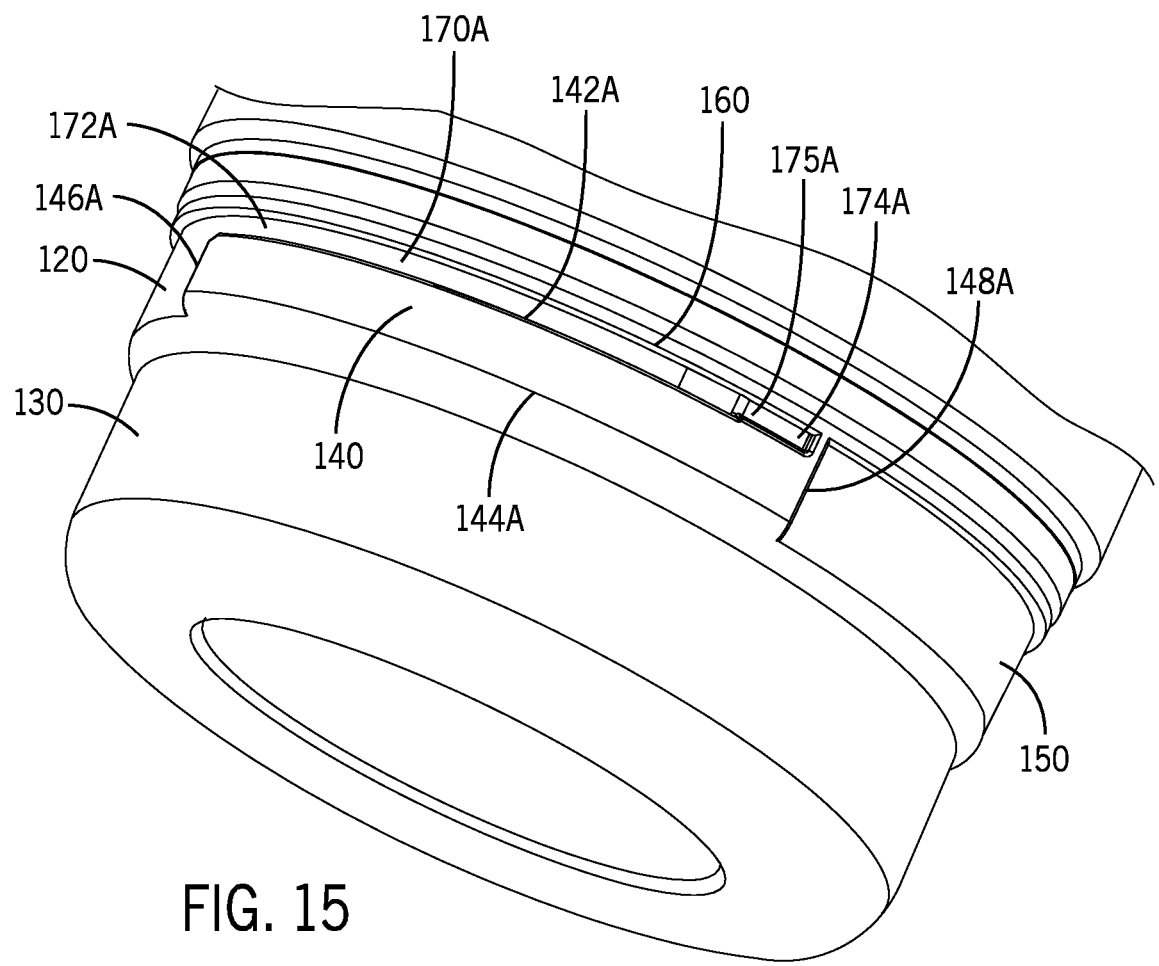
FIG. 15 is a perspective view of the lower portion of the container.
Figure 16:
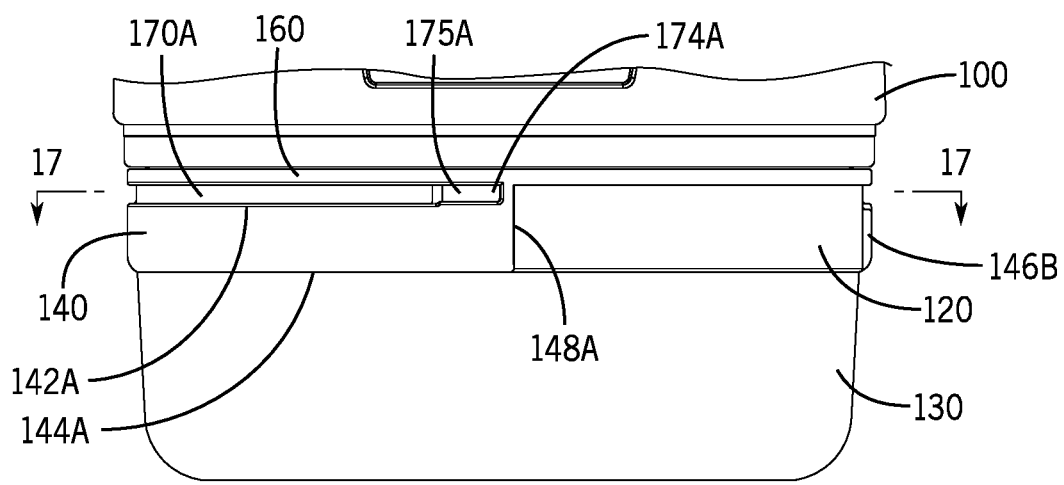
FIG. 16 is a front view of the lower portion of the container.
Figure 17:
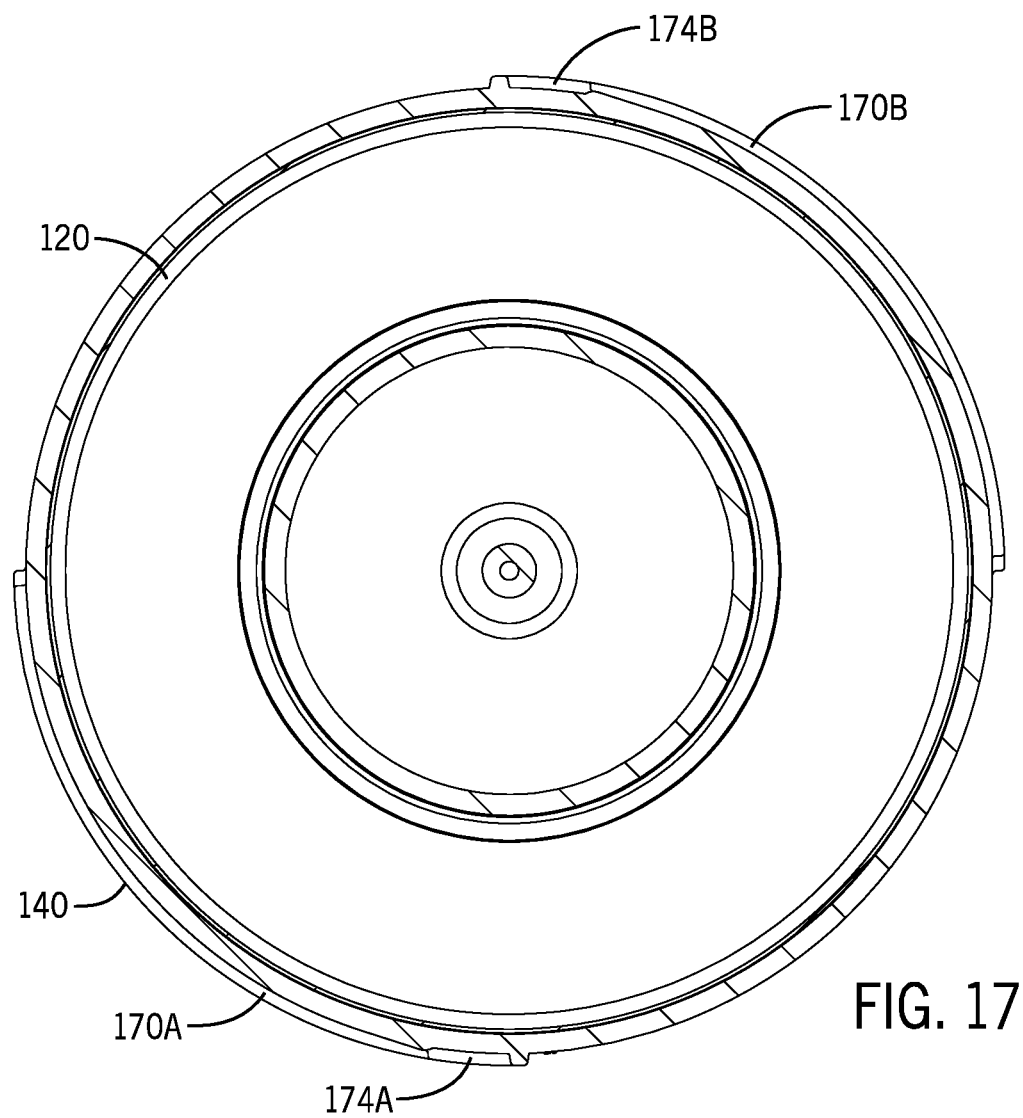
FIG. 17 is a sectional view of the lower portion of the container.
Figure 18:
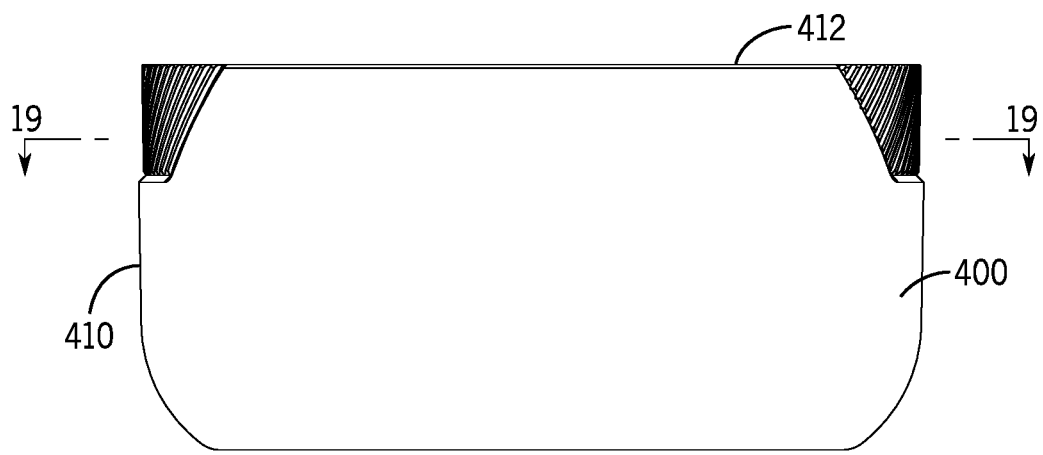
FIG. 18 is a view of the base.
Figure 19:
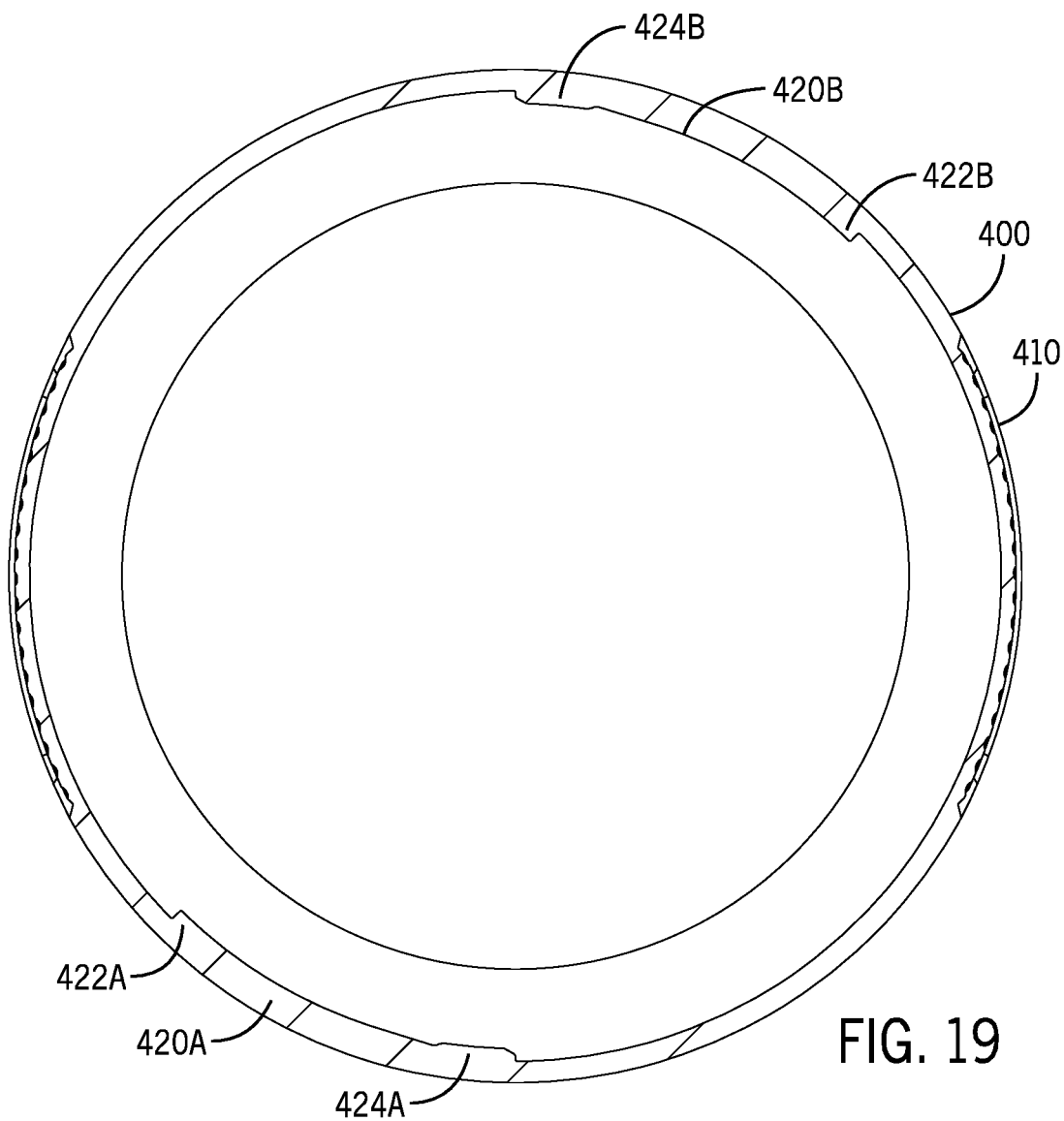
FIG. 19 is a sectional view of the base.
Figure 20:
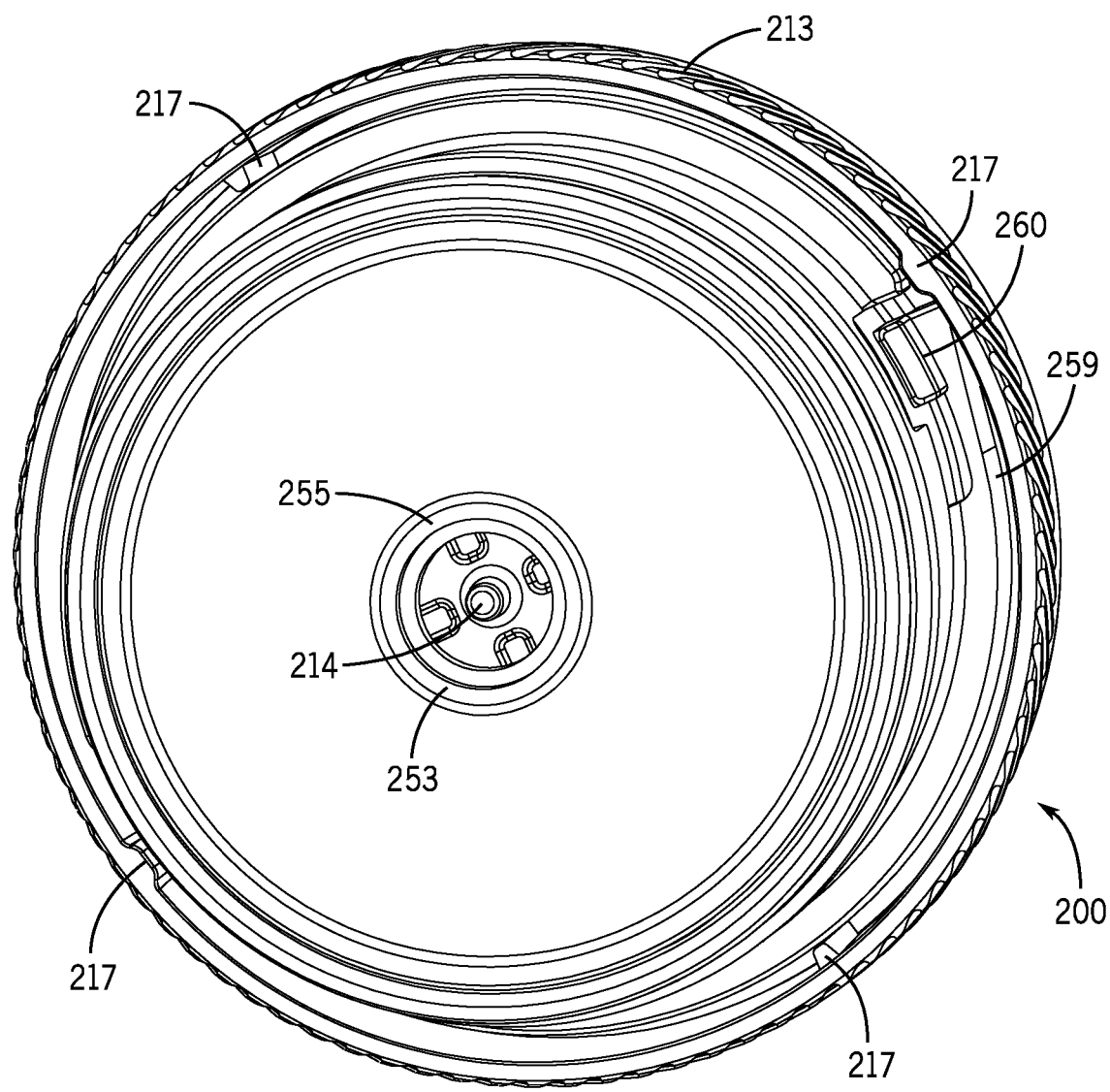
FIG. 20 is lower perspective view of the stopper.
Figures 21, 22:
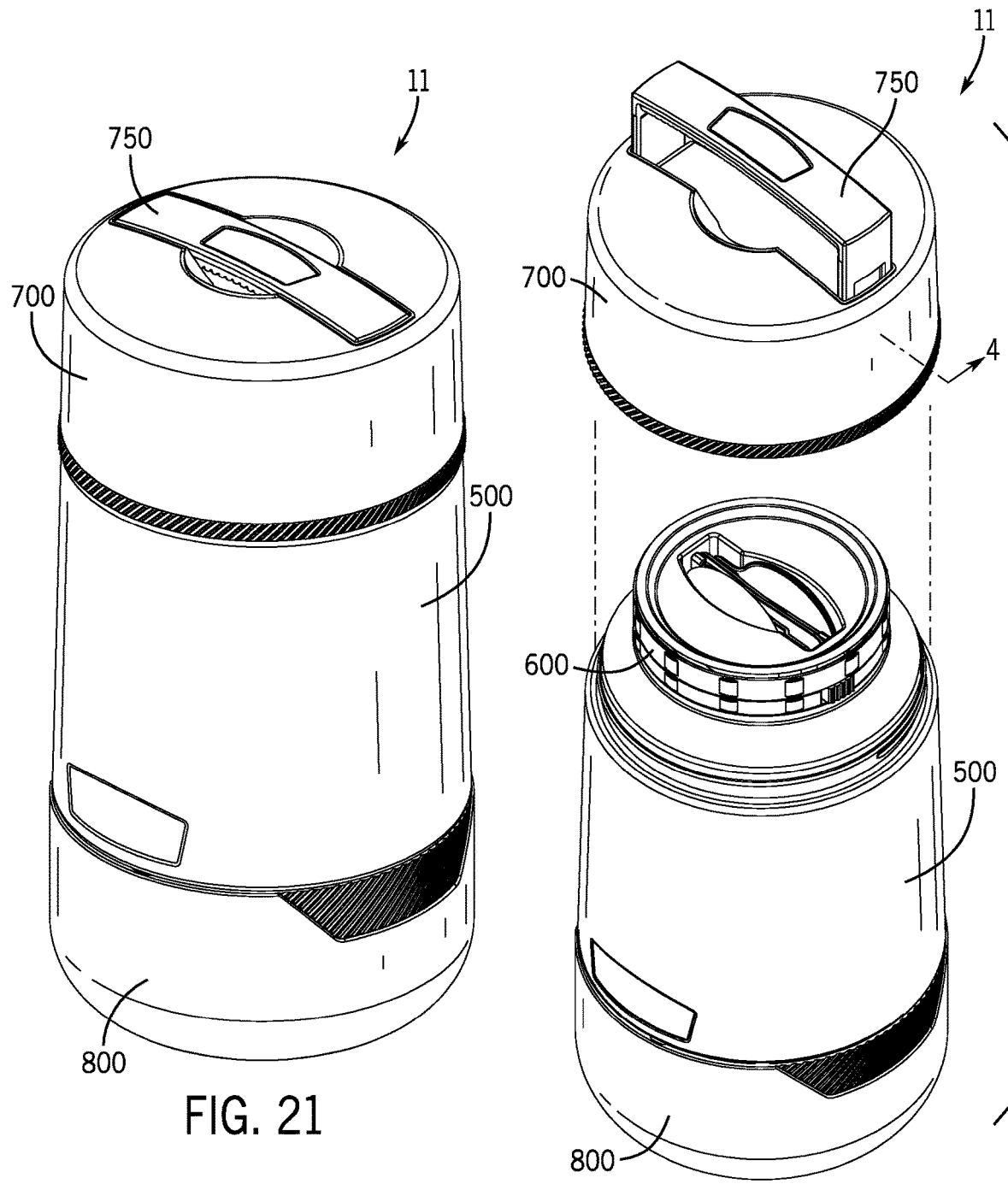
FIG. 21 is a perspective view of a second embodiment of a food jar.
FIG. 22 shows the lid removed from the container and uncovering the stopper.

With reference to FIG. 15, the retainer 140 includes an upper edge 142A generally opposite of a lower edge 144A. The retainer 140 includes a left edge 146A generally opposite of a right edge 148A. In the aspect shown, the upper edge 142A is generally perpendicular to a vertical axis of the container 100. In the illustrated aspect, the retainer 140 also includes an upper edge 142B generally opposite of a lower edge 144B. The retainer 140 also includes a left edge 146B generally opposite of a right edge 148B.

The container 100 further includes a protruding edge 160 positioned near the upper edge 142A and the upper edge 142B of the retainer 140. A first groove 170A is formed between the protruding edge 160 and the upper edge 142A of the retainer 140 and a second groove 170B is formed between the protruding edge 160 and the upper edge 142B of the retainer 140. As described below in greater detail, the grooves 170A and 170B of the container 100 receive the extending portions 420A and 420B of the base 400 when the base 400 is secured to the container 100.

As shown in FIG. 15, the first groove 170A includes a beginning portion 172A near the left edge 146A and an ending portion 174A near the right edge 148A. The ending portion 174A includes a recess 175A. When the extending portion 420A of the base 400 is aligned with the groove 170A and rotated, the second end 424A will eventually seat in the recess 175A of the ending portion 174A. The interaction of the second end 424A and the recess 175A provides a positive stop to the rotation of the base 400 to the container 100. This signifies to the user that the base 400 is securely engaged to the container 100. The second extending portion 420B engages to the second groove 170B in a similar fashion.

In order to engage the base 400 to the container 100, the base 400 is aligned with the container 100 such that the extending portions 420A and 420B are between the grooves 170A and 170B. In this aspect, the food jar 10 includes two grooves 170A and 170B and two extending portions 420A and 420B. The two grooves 170A and 170B are generally oppositely disposed on the lower portion 120 of the container 100. The two extending portions 420 are also generally oppositely disposed on the inner surface 414 of the sidewall 410 of the base 400.

With respect to FIG. 10, the first extending portion 420A is to the left of the groove 170A of the retainer 140 and the second extending portion 420B is to the left of the groove 170B of the retainer 140. The base 400 may now slide over the nested element 130 and onto the lower portion 120 of the container 100. The upper rim 412 may eventually contact the protruding edge 160 and stop the sliding movement. The second end 424A of the first extending portion 420A is now at the beginning portion 172A of the illustrated groove 170A and the second end 424B of the second extending portion 420B is similarly positioned with respect to the groove 170B. One or both of the container 100 and the base 400 may be rotated to drive the first extending portion 420A into the illustrated groove 170A and to drive the second extending portion 420B into the illustrated groove 170B. Once the extending portions 420A and 420B enter the grooves 170A and 170B, the base 400 is generally engaged to the container 100. After sufficient rotation, the second end 424A of the first extending portion 420A will eventually seat in the recess 175A of the ending portion 174A of the illustrated groove 170A, while the second end 424B of the second extending portion 420BA will similarly eventually seat in the recess 175B of the illustrated groove 170B. The container 100 and the base 400 are now fully engaged together. In order to detach or disengage the container 100 from the base 400, one or both of the container 100 and the base 400 should be rotated to first remove the extending portions 420A and 420B from the grooves 170A and 170B, and then the container 100 and the base 400 may be separated by a pulling motion.

In the illustrated aspect of FIGS. 1-20, the food jar 10 includes the two grooves 170A and 170 B and the two extending portions 420A and 420B. In other aspects, the retainer 140 or the lower portion 120 of the container 100 may include only a single groove that engages or interacts with single extending portion of the base 400. In such aspects, the single groove and the single extending portion may provide sufficient engagement between the base 400 and the container 100 to secure the base 400 to the container 100.

Turning now to FIGS. 21-25, another aspect of the present disclosure is illustrated. A food jar 11 includes a container 500, a stopper 600, a lid 700, and a base 800. The base 800 is configured to removably engage to the container 500. The base 800 defines a storage region 810, which may receive a bowl 820 or hold other items, condiments, food items, food additives, etc. The base 800 includes an upper rim 830 generally opposite of a bottom surface 835. Sidewalls 840 join the upper rim 830 and the bottom surface 835.

The storage region 810 is formed between the bottom surface 835 of the container 500 and an inner surface 802 of the base 800. The bowl 820 may be positioned in the storage region 810. The bowl 820 is sized and shaped to nest within the base 800. The base 800 removably or detachably engages to a lower region of the container 500.

The food jar 11 is generally similar in function and operation to the food jar 10, except for the type of removable engagement of the base 800 to the container 500. The food jar 11 utilizes a bayonet style engagement of the base 800 to the container 500. In certain aspects, features of the aspect illustrated in FIGS. 1-20 may be combined with or replaced by features of the aspect illustrated in FIGS. 21-25.

Similar to the food jar 10, the stopper 600 of the food jar 11 removably engages to an opening of the container 500. The lid 700 is positioned over the stopper 600. A top surface 710 of the lid 700 may include a retractable handle 750. The retractable handle 750 is configured to extend up to a carrying position and is configured to retract down to a storage position. Other handles known in the art may be added or replace the illustrated handle.

In the aspect shown, the inner surface 802 of the base 800 includes a channel 850 with a first portion 852 and a second portion 854, which is generally perpendicular to the first portion 852. The channel 850 is cut into or formed in the inner surface 802.

An opening 860 to the channel 850 is positioned at the upper rim 830 of the base 800. The first portion 852 is generally parallel to a vertical axis of the food jar 11. The second portion 854 is generally perpendicular to the vertical axis of the food jar 11.

A protrusion 560 on an exterior surface 510 of the container 500 fits into the first portion 852 and then into the second portion 854 in a removable or detachable engagement. When the base 800 is properly aligned with the container 500, the protrusion 560 may enter the opening 860 of the channel 850 and is urged through the first portion 852 and the second portion 854 of the channel 850. In order for the protrusion to enter the second portion 854, one or both of the container 500 and base 800 are rotated, which may drive the protrusion 560 to an end 865 of the channel 850. Once the protrusion 560 enters the second portion 854, the base 800 is generally engaged or locked to the container 500. In order to disengage or unlock the base 800 from the container 500, one or both of the container 500 and the base 800 are again rotated in an opposite direction. Then, the container 500 and the base 800 may be pulled apart and separated.

Figure 23:
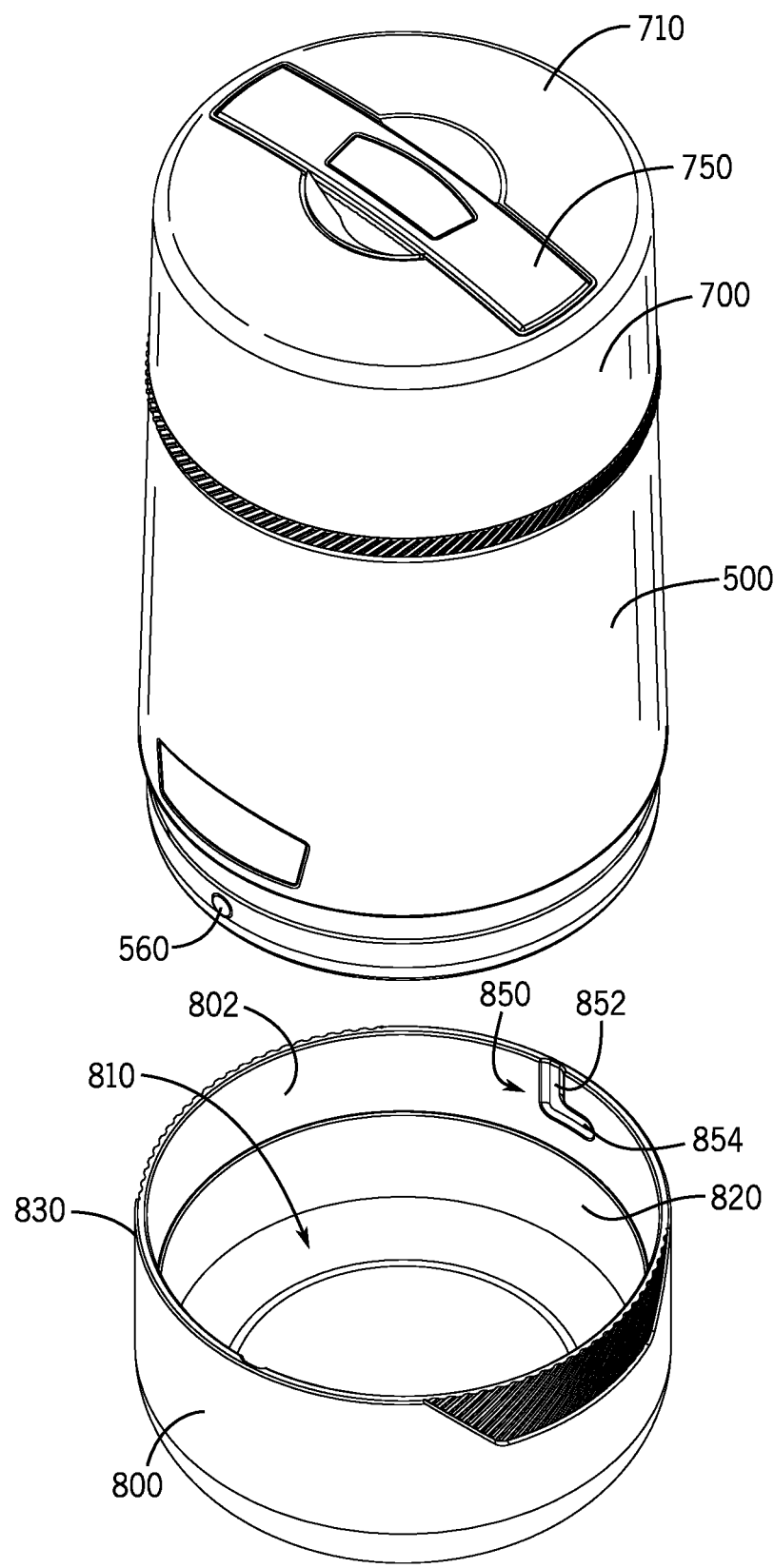
FIG. 23 is an exploded view of the container and base.
Figure 24:
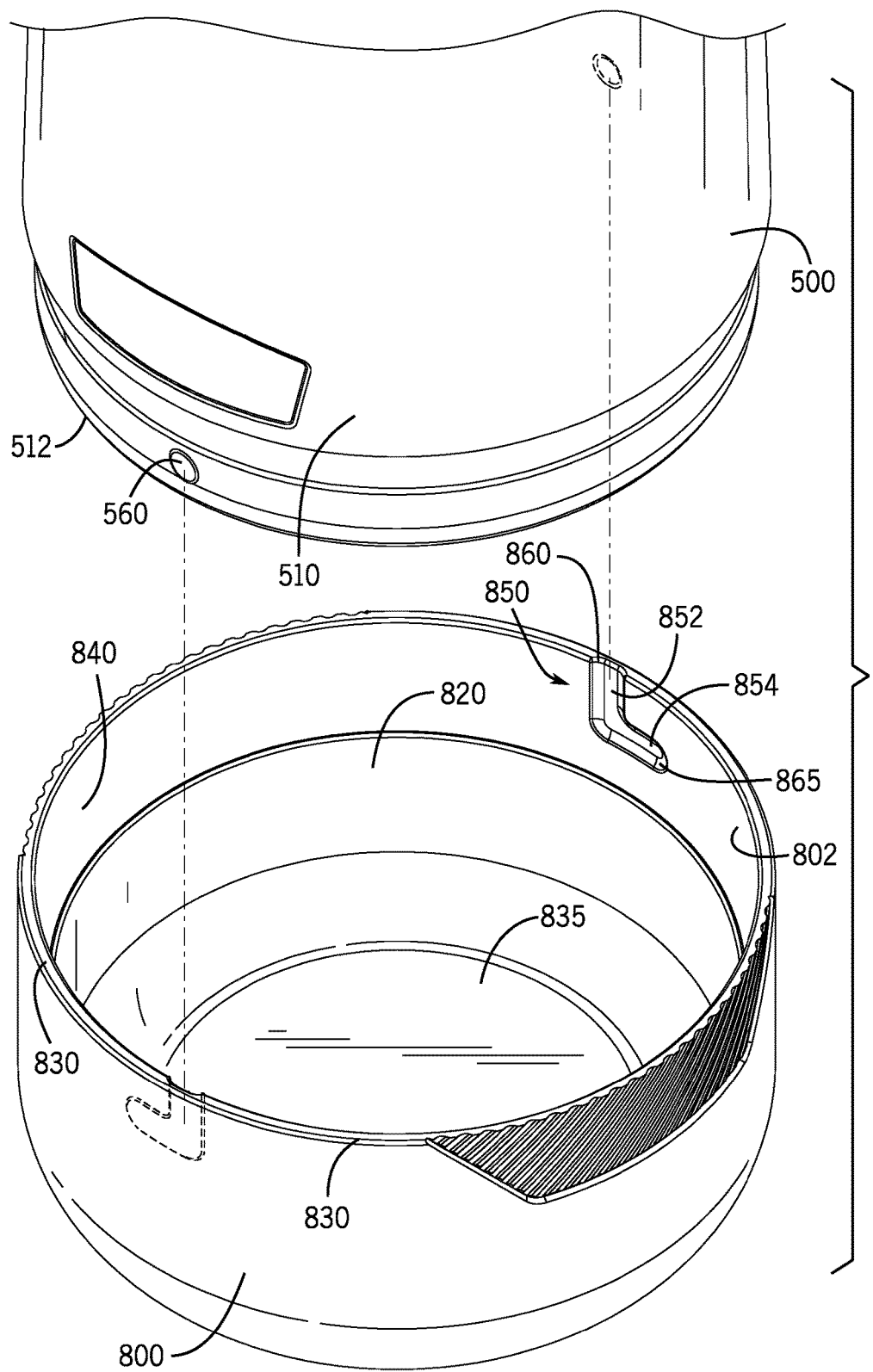
FIG. 24 shows the engagement of the base to the container.
Figure 25:
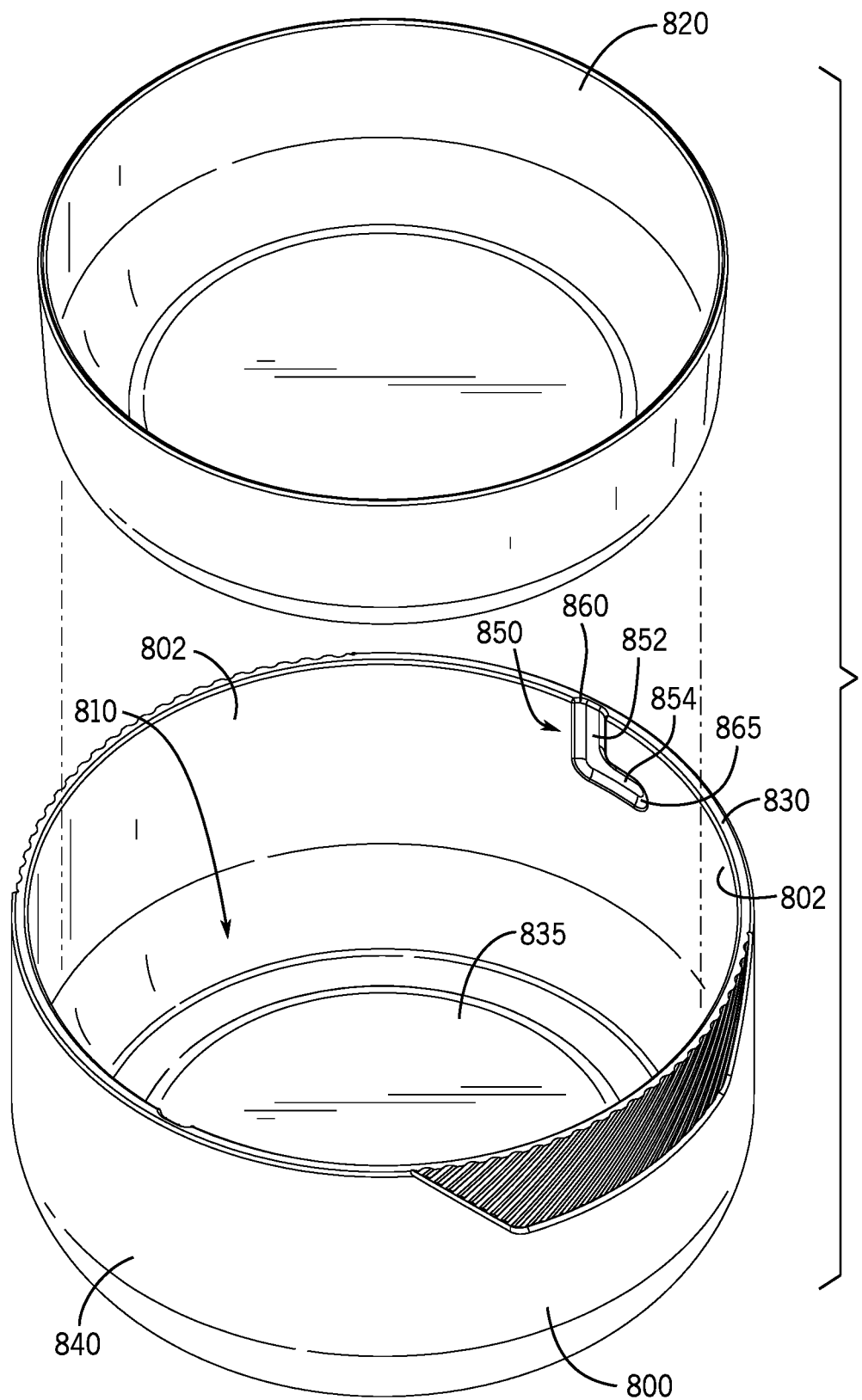
FIG. 25 shows the bowl removed from the base.

The protrusion 560 is formed at or near a bottom circumference 512 of the container 500. As shown in FIG. 23, the protrusion 560 is formed on the exterior surface 510 near the bottom circumference 512. The protrusion 560 may extend laterally from the exterior surface 510. The protrusion 560 may extend generally perpendicular to the vertical axis of the container 500. A second protrusion 560 may also be formed at or near a bottom circumference 512 of the container 500 to engage with a second channel 850.

The protrusion 560 may be welded or otherwise attached to the exterior surface 510. The protrusion 560 may also be integrally formed in the exterior surface 510. The protrusion 560 may include a rounded or circular shape to slide easier in the channel 850.

In still further aspects, the bases 400 and 800 described herein may thread to the lower region of the respective container 100 or 500 or otherwise detachably engage to the lower region of the respective container 100 or 500. For example, the bases 400 and 800 described herein may engage to the lower region of the respective container 100 or 500 via a snap fit, press fit, or other complementary locking mechanism.

As such, it should be understood that the disclosure is not limited to the particular aspects described herein, but that various changes and modifications may be made without departing from the spirit and scope of this novel concept as defined by the following claims. Further, many other advantages of applicant's disclosure will be apparent to those skilled in the art from the above descriptions and the claims below.

What is claimed is:

1. A food jar, comprising:
   a container, the container defining an interior to store a food product, the container forming an opening;
   a stopper, the stopper sized to removably close the opening of the container;
   the container comprising a retainer positioned at a lower portion of the container, the retainer comprising an upper edge;
   the container comprising a protruding edge positioned near the upper edge of the retainer;
   a groove is formed between the protruding edge and the upper edge of the retainer;
   a base, the base configured to removably engage to the lower portion of the container, wherein an inner surface of the base includes an extending portion; and,
   the groove receives the extending portion to engage the base to the container.

2. The food jar according to claim 1, wherein the extending portion comprises a rib, thread or other protrusion that that forms a segment on an inside of a sidewall of the base.

3. The food jar according to claim 1, wherein the base comprises a generally flat bottom and an upper rim, and the extending portion is generally parallel to the generally flat bottom and to the upper rim.

4. The food jar according to claim 1, wherein the base comprises a generally concave shape that forms a bowl or a vessel for serving food.

5. The food jar according to claim 1, wherein the extending portion protrudes from the inner surface of the base.

6. The food jar according to claim 1, wherein the groove includes a beginning portion and an ending portion, wherein the ending portion includes a recess.

7. The food jar according to claim 6, wherein the extending portion protrudes from the inner surface of the base, and the extending portion includes a first end and a second end, wherein the second end protrudes further from the inner surface of the base than the first end.

8. The food jar according to claim 7, wherein the second end seats in the recess.

9. The food jar according to claim 1, wherein a second groove is formed between the protruding edge and a second upper edge of the retainer; wherein the extending portion slides between the groove and the second groove.

10. The food jar according to claim 1, wherein the base is configured to slide onto the lower portion of the container, and wherein the base is configured to rotate to lock the base to the lower portion of the container.

11. The food jar according to claim 1, further comprising a lid configured to engage an upper region of the container and fit over the stopper, wherein the lid includes a handle that is configured to extend up to a carrying position and that is configured to retract down to a storage position.

12. The food jar according to claim 11, wherein the handle includes legs that are positioned on opposite sides of the handle, wherein the legs are received into the lid when the handle is in the storage position.

13. The food jar according to claim 1, the stopper having an upper body and a lower body, the upper body comprising a lower surface that includes or forms a closing member that opens and closes a vent passage of the lower body.

14. The food jar according to claim 13, wherein the closing member is inserted into the vent passage as the upper body is screwed into the lower body, which closes the vent passage, and wherein the closing member is removed from the vent passage as the upper body is unscrewed from the lower body to open the vent passage.

15. The food jar according to claim 1, wherein the base comprising a second extending portion, wherein a second groove is formed between the protruding edge and a second upper edge of the retainer, wherein the extending portion slides between the groove and the second groove on a first side of the container, and wherein the second extending portion slides between the groove and the second groove on a second side of the container.

16. The food jar according to claim 15, wherein the extending portion rotates in the groove, and the second extending portion rotates in the second groove.

17. A food jar, comprising:
 a container, the container defining an interior to store a food product, the container forming an opening;
 a stopper, the stopper sized to removably close the opening of the container;
 the container comprising a retainer positioned at a lower portion of the container, the retainer comprising an upper edge and a lower edge, and the lower edge adjacent to a bottom of the container;
 a groove or track is formed next to the upper edge of the retainer;
 a base, the base configured to removably engage to the lower portion of the container, wherein an inner surface of the base include a rib that forms a segment on an inside of a sidewall of the base; and,
 the groove or track receives the rib to engage the base to the container.

* * * * *